(12) United States Patent
Matsuzaki et al.

(10) Patent No.: US 11,040,547 B2
(45) Date of Patent: Jun. 22, 2021

(54) RECORDING METHOD USING COLOR INK COMPOSITION HAVING A HUE ANGLE THAT IS DIFFERENT FROM OTHER COLOR INK COMPOSITIONS

(71) Applicant: Seiko Epson Corporation, Tokyo (JP)

(72) Inventors: Akiko Matsuzaki, Matsumoto (JP); Akira Mizutani, Matsumoto (JP)

(73) Assignee: Seiko Epson Corporation

( * ) Notice: Subject to any disclaimer, the term of this patent is extended or adjusted under 35 U.S.C. 154(b) by 39 days.

(21) Appl. No.: 16/355,953

(22) Filed: Mar. 18, 2019

(65) Prior Publication Data

US 2019/0284427 A1    Sep. 19, 2019

(30) Foreign Application Priority Data

Mar. 19, 2018 (JP) .............................. JP2018-051555
Jun. 15, 2018 (JP) .............................. JP2018-114639

(51) Int. Cl.
| | |
|---|---|
| *B41J 2/21* | (2006.01) |
| *B41J 11/00* | (2006.01) |
| *B41M 7/00* | (2006.01) |
| *B41J 2/205* | (2006.01) |

(52) U.S. Cl.
CPC .............. *B41J 2/21* (2013.01); *B41J 2/2056* (2013.01); *B41J 2/2114* (2013.01); *B41J 11/002* (2013.01); *B41M 7/00* (2013.01); *B41J 2002/2058* (2013.01)

(58) Field of Classification Search
CPC . B41J 2/21; B41J 2/2114; B41J 2/2056; B41J 11/002; B41J 2002/2058; B41J 2/2107; B41M 5/0011; B41M 7/00; B41M 7/0018
See application file for complete search history.

(56) References Cited

U.S. PATENT DOCUMENTS

2019/0284426 A1*  9/2019  Matzuaki ............. B41J 2/2107

FOREIGN PATENT DOCUMENTS

JP          2017-186472 A       10/2017

* cited by examiner

*Primary Examiner* — Henok D Legesse
(74) *Attorney, Agent, or Firm* — Harness, Dickey & Pierce, P.L.C.

(57) ABSTRACT

A recording method includes: ejecting colored ink compositions that include a cyan ink composition, a magenta ink composition, a yellow ink composition, and a special color ink composition with a hue angle different from hue angles of the respective ink compositions from an ink jet head and causing the ink compositions to adhere to a recording medium; and causing a processing solution containing a coagulant for coagulating constituents of the colored ink compositions to adhere to the recording medium, the causing of the ink compositions to adhere is performed by performing scanning, in which the colored ink compositions are ejected while a relative position of the ink jet head with respect to the recording medium is changed in a scanning direction, a plurality of times, and a maximum distance of scanning performed once in the causing of the ink compositions to adhere is equal to or greater than 50 cm.

20 Claims, 4 Drawing Sheets

RECORDING METHOD USING COLOR INK COMPOSITION HAVING A HUE ANGLE THAT IS DIFFERENT FROM OTHER COLOR INK COMPOSITIONS

BACKGROUND

1. Technical Field

The present invention relates to a recording method.

2. Related Art

According to ink jet recording methods, it is possible to record fine images with relatively simple apparatuses, and the ink jet recording methods have rapidly been developed in various fields. Among the methods, ejection stability and the like have been studies in various manners. For example, JP-A-2017-186472 discloses a water-based ink jet ink composition that includes: resin; a nitrogen-containing solvent with an SP value difference within 3 with respect to the resin; and water, in which the content of the nitrogen-containing solvent is 2 to 9 parts by mass with respect to 1 part by mass of the resin, and the content of an organic solvent with a standard boiling point of equal to or greater than 280° C. is equal to or less than 3% by mass for the purpose of providing a water-based ink jet ink composition capable of forming an image with excellent clogging resistance in a head and with excellent abrasion resistance. As JP-A-2017-186472, an ink composition, which has resin that is sufficiently dissolved and easily forms a film on a recording medium, which has excellent abrasion resistance, and which has the resin that is welded in a head, is not easily removed by cleaning, and does not easily recover due to utilization of a predetermined solvent is known.

It is possible to obtain a recorded product that is useful for display by performing recording on a recording medium with a wide width using the ink jet printer. Recently, there is a problem that colors differ depending on locations in an image on the recording medium in a case in which recording is performed such that the distance of scanning performed once is long on the recording medium with the wide width and it is attempted to improve image quality using a processing solution for coagulating constituents of ink.

SUMMARY

An advantage of some aspects of the invention is to provide a recording method capable of suppressing occurrence of a color difference in a recorded product in a case as described above.

The present inventors have conducted intensive studies to solve the aforementioned problem. As a result, the present inventors have discovered that the aforementioned problem can be solved by using basic color ink compositions and a special color ink composition together and have completed the invention.

That is, the invention is as follows.

[1] According to an aspect of the invention, there is provided a recording method including: ejecting colored ink compositions that include a cyan ink composition, a magenta ink composition, a yellow ink composition, and a special color ink composition with a hue angle that is different from hue angles of the respective ink compositions from an ink jet head and causing the ink compositions to adhere to a recording medium; and causing a processing solution that contains a coagulant for coagulating constituents of the colored ink compositions to adhere to the recording medium, in which the causing of the ink compositions to adhere is performed by performing scanning, in which the colored ink compositions are ejected while a relative position of the ink jet head with respect to the recording medium is changed in a scanning direction, a plurality of times, and a maximum distance of scanning performed once in the causing of the colored ink compositions to adhere is equal to or greater than 50 cm.

[2] In the recording method according to [1], the special color ink composition may include at least any of an orange ink composition, a red ink composition, a green ink composition, and a blue ink composition.

[3] In the recording method according to [1] or [2], the colored ink compositions may further include a black ink composition.

[4] In the recording method according to any one of [1] to [3], the recording medium may be low-absorbable recording medium or a non-absorbable recording medium.

[5] The recording method according to any one of [1] to [4] may further include: heating the recording medium, the causing of the ink compositions to adhere being performed on the heated recording medium; or feeding wind to a region to which the colored ink compositions are caused to adhere in the causing of the ink compositions to adhere.

[6] In the recording method according to any one of [1] to [5], a surface temperature of the recording medium when the colored ink compositions are caused to adhere in the causing of the ink compositions to adhere may be 30° C. to 45° C.

[7] In the recording method according to any one of [1] to [6], a maximum time of the scanning performed once in the causing of the ink compositions to adhere may be equal to or greater than 0.8 seconds.

[8] In the recording method according to any one of [1] to [7], the coagulant may be any one kind or more of polyvalent metal salts, organic acids or salts thereof, and cationic resin.

[9] In the recording method according to any one of [1] to [8], a maximum distance of the scanning performed once in the causing of the ink compositions to adhere may be 50 to 500 cm.

[10] In the recording method according to any one of [1] to [9], a region in which an amount of the adhering processing solution is 5% by mass to 30% by mass with respect to an amount of the adhering colored ink compositions may be included in a recording region to which the colored ink compositions and the processing solutions are caused to adhere.

[11] In the recording method according to any one of [1] to [10], a temperature difference in surface temperatures of the recording medium in the causing of the ink compositions to adhere may be 1° C. to 10° C.

[12] According to another aspect of the invention, there is provided a recording method including: ejecting colored ink compositions that include a cyan ink composition, a magenta ink composition, a yellow ink composition, and a special color ink composition with a hue angle that is different from hue angles of the respective ink compositions from an ink jet head and causing the ink compositions to adhere to a recording medium; and causing a processing solution that contains a coagulant for coagulating constituents of the colored ink compositions to adhere to the recording medium, in which the causing of the ink compositions to adhere is performed by performing scanning, in which the colored ink compositions are ejected while a relative position of the ink jet head with respect to the recording medium is changed in a scanning direction, a plurality of times, and a difference in surface temperatures of the recording medium when the colored ink is caused to adhere in the causing of the ink compositions to adhere is from 1° C. to 10° C.

[13] According to still another aspect of the invention, there is provided a recording apparatus that performs recording by the recording method according to any one of [1] to [12].

BRIEF DESCRIPTION OF THE DRAWINGS

The invention will be described with reference to the accompanying drawings, wherein like numbers reference like elements.

FIG. 2A illustrates a mode in which no carriage is arranged and FIG. 2B illustrates a mode in which a carriage is arranged.

DESCRIPTION OF EXEMPLARY EMBODIMENTS

Figure 1:
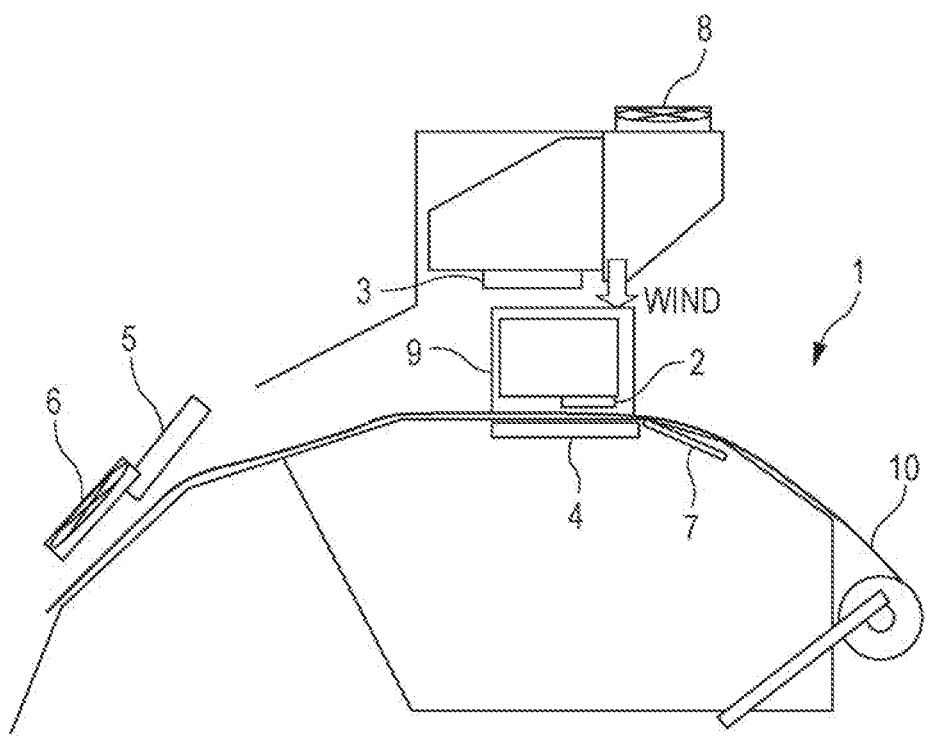
FIG. 1 is a schematic sectional view illustrating a configuration of a recording apparatus that is used in an embodiment.

Hereinafter, an embodiment of the invention (hereinafter, referred to as an embodiment) will be described in detail with reference to drawings as needed. However, the invention is not limited thereto, and various modifications can be made without departing from the gist thereof. Note that the same reference numerals will be given to the same elements in the drawings and repeated description will be omitted. In addition, the positional relationships such as upward, downward, left, right, and the like are on the basis of the positional relationship illustrated in the drawings unless otherwise particularly indicated. Further, dimensional ratios in the drawings are not limited to the ratios illustrated in the drawings.

Recording Method

The recording method according to the embodiment includes: an ink adhesion process of ejecting colored ink compositions that include a cyan ink composition, a magenta ink composition, a yellow ink composition, and a special color ink composition with a hue angle that is different from those of the respective ink compositions from an ink jet head and causing the colored ink compositions to adhere to a recording medium; and a processing solution adhesion process of causing a processing solution that contains a coagulant for coagulating constituents of the colored ink composition to adhere to the recording medium, the ink adhesion process is performed by performing scanning, in which the colored ink compositions are ejected while a relative position of the ink jet head with respect to the recording medium is changed in a scanning direction, a plurality of times, and a maximum distance of the scanning performed once in the ink adhesion process is equal to or greater than 50 cm.

As described above, it has been discovered that there is a unique problem that a color difference increases in the recording method in which the distance of the scanning performed once is long. Examples of a recording apparatus in which the distance of scanning is long include a large format printer and the like.

In a case in which a processing solution is used, image quality is improved since it is possible to fix ink droplets that have adhered to the recording medium early. In contrast, in a case in which ink compositions of a plurality of colors are used, it is estimated that the color difference increases since there may be a difference in coagulation depending on an adhesion order of the ink compositions. Meanwhile, in a case in which no reaction solution is used, it is estimated that aggregation occurs before the adhering ink droplets are fixed and the color difference increases. The color difference is a difference in colors depending on locations regardless of the fact that it is attempted to record an image of the same color in one recording medium. In a case in which a recording medium with a wide width in the scanning direction is used, the distance of the scanning performed once increases, and the color difference in the scanning direction tends to occur. It is estimated to be because in the case in which the distance of the scanning performed once is long, influences of factors of the color difference, which will be described later, are large. The color difference will also be referred to as an in-plane color difference.

In addition, a scanning time of one pass is long in a recording apparatus with a wide width in the scanning direction of the recording medium, and in such a case, recording may be performed by increasing a moving speed of a carriage in order to improve producibility and image quality. However, influences of wind due to the movement increase at the same time, and the influences may affect the color difference.

Image quality is improved by raising a heating temperature in order to quicken drying of the ink in addition to or instead of using the processing solution. In a case in which recording is performed on a low-absorbable recording medium or a non-absorbable recording medium, it is effective to promote the drying by performing heating during the recording in order to improve image quality. However, it has been discovered that the color difference also increases due to drying during recording. This is estimated to be because temperature deviation tends to occur in the width direction in a case in which a heater is provided behind the recording medium or wind is blown thereto, and in a recording apparatus with a wide width in the scanning direction of the recording medium, such as a large format printer, in particular, the temperature deviation cannot be ignored in terms of the color difference. In a case in which the width in the scanning direction is wide, in particular, large numbers of joint portion of the heater and wind outlet ports and a large number of locations where in-plane temperature differences tend to occur due to the configuration of the apparatus may be factors of the large temperature difference. As a result, a color difference due to the temperature deviation depending on the aforementioned heating locations occurs.

Further, the weight itself of the ejected dots may change, or landing deviations due to non-uniformity of meniscus may occur due to promotion of the drying in the vicinity of nozzles through the heating. In the recording method using the recording apparatus with the wide width in the scanning direction, it is estimated that the color difference tends to occur due to such composite factors.

Meanwhile, it is possible to reduce the color difference by using a basic color ink composition and a special color ink composition together in the embodiment. This is estimated to be because that recording a color in a special color region using a special color ink composition does not tend to express a color difference even if slight fluctuations occur in an aggregating state of the dots on a recording surface due to landing deviations or the like and differences occur in how dots spread depending on drying deviations. In this manner, it is possible to perform recording with a small color difference from a basic color region to a special color region. Hereinafter, the respective processes will be described in detail. The special color region is a portion recorded with a special color of the image.

Meanwhile, it is assumed that the color difference increases in a case in which a color of a special color region is reproduced as a secondary color on the recording medium by causing dots of ink of two colors to densely present together and in a case in which fluctuations in the aggregating state of the dots on the recording surface and the differences occur in how dots spread occur or the order of adhesion of the ink differs.

Ink Adhesion Process

The ink adhesion process is a process of ejecting a colored ink composition that includes a cyan ink composition, a magenta ink composition, a yellow ink composition, and a special color ink composition with a hue angle that is different from those of the respective ink compositions from an ink jet head and causing the colored ink composition to adhere to a recording medium. Here, the ink jet head is a head that ejects the ink compositions to the recording medium and performs recording, and the head has a cavity that causes the accommodated ink composition to be ejected from nozzles, an ejection drive unit that applies ejection drive force to the ink compositions, and nozzles that eject the ink compositions to the outside of the head. The ejection drive unit can be formed with an electromechanical transformation element such as a piezoelectric element that changes a volume in the cavity using mechanical deformation, an electrothermal transformation element that generates air bubbles in the ink by generating heat and ejects the ink, or the like.

The ink adhesion process is performed by performing scanning, in which the ink compositions are ejected while the relative position of the ink jet head with respect to the recording medium is changed in the scanning direction, a plurality of times. That is, the ink jet head is preferably a serial head. In the serial scheme using the serial head, it is possible to record an image on the recording medium by causing the head to move in a main scanning direction (the lateral direction or the width direction of the recording medium) and ejecting ink droplets from nozzle openings of the head in conjunction with the movement. The scanning may be performed by the head being mounted on a carriage or the like and by the carriage moving in the main scanning direction. In the invention, the scanning will also be referred to as main scanning.

Then, the recording is caused to advance by alternately repeating the scanning and sub scanning, thereby causing the recording medium to gradually move in the sub scanning direction (a longitudinal direction or a transport direction of the recording medium).

The maximum distance of the scanning performed once is equal to or greater than 50 cm, is preferably from 50 to 500 cm, is more preferably from 50 to 400 cm, is further preferably from 55 to 300 cm, and is still further preferably from 60 to 200 cm. The maximum distance is particularly preferably from 70 to 190 cm, is more particularly preferably from 100 to 180 cm, and is further particularly preferably from 130 to 170 cm.

If the distance is equal to or greater than 50 cm, it is possible to obtain a recorded product that is useful for display or the like. In contrast, it is possible to reduce the color difference according to the invention although the color difference tends to occur in the obtained recorded product, and the invention is particularly useful. Also, although the upper limit of the distance is not particularly limited, the upper limit is preferably equal to or less than 500 cm in terms of the configuration of the recording apparatus and more excellent reduction of the color difference.

"The maximum distance of the scanning performed once" means a distance at which one point of the ink jet head faces the recording medium in a case of recording from an end to an end in the scanning direction of the recording medium in the scanning performed once. Note that scanning with a distance that is shorter than the aforementioned maximum distance of the scanning performed once may be performed in accordance with an image to be recorded when the recording method is performed.

An additional reason that the color difference tends to occur in the recorded product as the maximum distance of the scanning performed once increases other than the reason described above is estimated to be because a portion of a recording medium floating from a platen occurs when the recording medium is transported and this leads to landing deviations of the ink (position deviations). Further, the floating of the recording medium also causes the temperature difference of the surface temperature of the recording medium.

A recording medium with a width in the scanning direction within the aforementioned maximum distance of the scanning performed once is preferably used as the recording medium. This is preferable since it is possible to obtain the aforementioned maximum distance of the scanning performed once.

The maximum time of the scanning performed once in the ink adhesion process is preferably equal to or greater than 0.8 seconds. The maximum time is preferably from 0.8 seconds to 5 seconds or less, is more preferably equal to or greater than 0.8 seconds and equal to or less than 4 seconds, is further preferably equal to or greater than 0.8 seconds and equal to or less than 3 seconds, and is particularly preferably from 1.5 seconds to 2.5 seconds. The maximum time of the scanning performed once preferably falls within the aforementioned range since this is suitable for performing recording on the recording medium with the width within the aforementioned range. Although the color difference tends to occur in the obtained recorded product, the invention is particularly useful since it is possible to reduce the color difference. Note that "the maximum time of the scanning performed once" means a time during which one point of the ink jet head faces the recording medium in a case of performing recording from an end to an end in the scanning direction of the recording medium in the scanning performed once. Note that scanning may be performed during a time that is shorter than the aforementioned maximum time of the scanning performed once in accordance with an image to be recorded when the recording method is performed.

Note that an average scanning speed in the ink adhesion process is preferably from 60 to 100 cm/second.

It is preferable that the recording method include a heating process of heating the recording medium and that the ink adhesion process be performed on the heated recording surface of the recording medium. For heating the recording medium, a warming mechanism such as a platen heater, a warm wind heater, or an IR heater can be used. The surface temperature of the recording medium when the ink compositions are caused to adhere in the ink adhesion process is preferably from 20° C. to 60° C., is more preferably from 20° C. to 50° C., is further preferably from 25° C. to 45° C., is further preferably from 30° C. to 40° C., and is particularly preferably from 32° C. to 38° C. Image quality of the obtained recorded product tends to be improved by heating the recording medium and raising the surface temperature. Also, ejection stability and nozzle clogging recovery tend to be further improved by setting the surface temperature of the recording medium to be equal to or less than 60° C.

The heating process may be performed such that the surface temperature of the recording medium rises to be higher than an ordinary temperature by the recording medium receiving heat generated by the recording apparatus itself, for example. That is, this means that the surface temperature of the recording medium is higher than the ordinary temperature.

Note that a temperature of the entire region, which can face during the main scanning of the head, on the recording medium supported by the platen is measured, and the maximum temperature of the temperature of the surface of the recording medium during the recording of the region is regarded as the aforementioned surface temperature of the recording medium.

A portion at which the surface temperature of the recording medium is lower than the maximum temperature may occur, and this may lead to a temperature difference, during the recording of the region. The temperature difference tends to increase as the maximum distance of the scanning performed once increases. One of the reasons is that it becomes difficult to uniformly heat the entire recording medium in the scanning direction.

A temperature difference between the maximum temperature and the minimum temperature of the temperature of the entire region, which can face during the main scanning of the head, on the recording medium supported by the platen is preferably equal to or less than 10° C., is more preferably equal to or less than 7° C., and is further preferably equal to or less than 5° C. The aforementioned temperature difference is preferably equal to or greater than 1° C., is more preferably equal to or greater than 2° C., and is further preferably equal to or greater than 3° C. The temperature difference preferably falls within the aforementioned range in terms of a more excellent reduction of the color difference and a higher degree of freedom in designing the recording apparatus. The lower surface temperature is more preferable in terms of reduction of the color difference since the temperature difference tends to decrease as the aforementioned surface temperature of the recording medium is lower.

More excellent suppression of density irregularity, the color difference, and the like is achieved by promoting the drying of the ink through the heating process. The surface temperature of the recording medium when the ink is caused to adhere is preferably equal to or greater than the aforementioned range in terms of this point. Meanwhile, the surface temperature of the recording medium is preferably equal to or less than the aforementioned range since more excellent suppression of the color difference is achieved due to suppression of occurrence of temperature irregularity that may become a reason of the occurrence of the color difference.

The ink adhesion process preferably includes a blowing process of blowing wind to the region to which the ink compositions have been adhered. Although the blowing method is not particularly limited, a blower or the like provided in the recording apparatus is used, for example. By including the blowing process, it is possible to efficiently dry the ink compositions that have adhered to the recording medium, and roughness of the obtained recorded product and the density irregularity tend to be further suppressed.

The temperature of the wind in the blowing process may be a temperature of warm wind for heating the recording medium, and in this case, the wind may be fed in the aforementioned heating process of heating the recording medium. This is preferable since image quality on the obtained recording medium is further improved. Alternatively, the wind may also be fed as wind at the ordinary temperature that does not heat the recording medium. This is also preferable since evaporation of the constituents of the ink is promoted, obtained image quality on the recording medium is further improved, and excellent ink ejection stability from the head is achieved. The temperature of the wind to be fed may be the surface temperature of the recording medium in the aforementioned heating process of heating the recording medium. Alternatively, the specific temperature of the wind to be fed is preferably equal to or less than 70° C., is more preferably equal to or less than 50° C., is further preferably equal to or less than 40° C., is further preferably equal to or less than 35° C., and is particularly preferably equal to or less than 30° C. Although the lower limit of the temperature of the wind is not limited, the lower limit is preferably equal to or greater than 20° C. Meanwhile, in a case in which the blowing process is provided, a difference tends to occur in the surface temperature of the recording medium.

A region in which the total amount of the adhering colored ink compositions is from 5 to 30 mg/inch$^2$ is preferably included in the recording region to which the colored ink compositions and the processing solution are caused to adhere, a region in which the total amount thereof is from 7 to 25 mg/inch$^2$ is more preferably included therein, and a region in which the total amount thereof is from 9 to mg/inch$^2$ is further preferably included therein. By having a region with such an adhesion amount, it is possible to obtain a recorded product that is useful for display or the like. Further, the total amount of adhesion in a region, in which the total amount of the adhering colored ink compositions is the maximum, in the recording region preferably falls within the aforementioned range in terms of the aforementioned point.

Post-Heating Process

A post-heating process of further heating the recording medium is preferably provided after the ink adhesion process. Although the heating method is not particularly limited, examples thereof include a platen heater, a warm wind heater, and an IR heater. The heating temperature can be preferably set to be equal to or greater than 60° C. The heating temperature is preferably from 70 to 110° C. and is more preferably from 80° C. to 100° C.

Colored Ink Compositions

The colored ink compositions include a cyan ink composition, a magenta ink composition, a yellow ink composition, and a special color ink composition with a hue angle that is different from those of the three ink compositions. Here, the "hue angle" means a hue angle of a CIE color system when an image is recorded with the ink compositions and the color is measured. Specifically, an image is recorded using each ink, and the color of the recorded portion is measured. Any image may be used here as long as it is possible to check the hue angle of the portion recorded by the adhesion of the ink. Examples thereof include an image obtained by causing the ink to adhere to a white recording medium such that the amount of adhesion thereof is 10 mg/inch$^2$.

The cyan ink composition, the magenta ink composition, and the yellow ink composition respectively have mutually different hue angles. In the embodiment, the hue angle (∠H°) of the cyan ink composition is preferably from 230° to 260°, the hue angle (∠H° of the magenta ink composition is preferably from 330° to 360°, and the hue angle of the yellow ink composition (∠H°) is preferably from 80° to 110°. The cyan ink composition, the magenta ink composition, the yellow ink composition, and the special color ink composition are respectively chromatic ink with which it is possible to record chromatic colors with the aforementioned hue angles.

Although the special color ink composition is not particularly limited as long as the hue angle thereof is different from those of the cyan ink composition, the magenta ink composition, and the yellow ink composition used in the recording method, at least any of an orange ink composition, a red ink composition, a green ink composition, and a blue ink composition is exemplified, for example. One kind of the special color ink compositions may be used alone, or two or more kinds of the special color ink compositions may be used in combination. The color difference is suppressed by using the special color ink composition. Although the hue angle of the special color ink is not limited, the special color ink with the hue angle within the range, which will be described later, is preferably used. For example, the special ink with a hue angle outside the preferable ranges of the hue angles of the cyan ink composition, the magenta ink composition, and the yellow ink composition may also be used.

In addition, the colored ink compositions may further include a black ink composition in addition to the aforementioned ink compositions. A color expression region of the obtained recorded product tends to be extended by using the black ink composition. Note that the special color ink composition is not a black ink composition.

Each ink composition included in the colored ink compositions includes a coloring material. The ink composition preferably includes a solvent and can include resin, a wax, an antifoaming agent, and a surfactant as needed. The ink composition preferably contains fine resin particles and an organic solvent. The ink composition is preferably a water-based ink composition. The water-based composition is a composition that includes water as one of main solvent constituents, and the content of water is preferably equal to or greater than 45% by mass. A similar basic composition can be exemplified independently for each ink composition included in the colored ink compositions other than that the hue angle differs due to a difference of the type of the coloring material used. Hereinafter, each constituent will be described.

Coloring Material

Examples of the coloring material include a pigment and a dye. The pigment is preferably used in terms of excellent light resistance and the like.

Although the pigment used in the cyan ink composition is not particularly limited, and examples thereof include C.I. Pigment Blue, 1, 2, 3, 15, 15:1, 15:2, 15:3, 15:34, 15:4, 16, 18, 25, 65, and 66 and C.I. Vat Blue and 60. Note that the hue angle (∠H°) of the cyan ink composition is preferably from 230° to 260°.

Although the pigment used in the magenta ink composition is not particularly limited, examples thereof include C.I. Pigment Red 1, 2, 3, 4, 5, 6, 7, 8, 9, 10, 11, 12, 14, 15, 16, 18, 19, 21, 22, 23, 30, 31, 32, 37, 38, 40, 41, 42, 48 (Ca), 48 (Mn), 53, 57 (Ca), 57:1, 88, 114, 122, 123, 144, 146, 150, 166, 168, 170, 171, 176, 179, 184, 185, 187, 202, 209, 219, 224, and 245 and C.I. Pigment Violet 33, 43, and 50. Note that the hue angle (∠H°) of the magenta ink composition is preferably from 330° to 360°.

Although the pigment used in the yellow ink composition is not particularly limited, examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180. Note that the hue angle (∠H°) of the yellow ink composition is preferably from 80° to 110°.

Although carbon black used in the black ink composition is not particularly limited, examples thereof include No. 2300, No. 900, MCF88, No. 33, No. 40, No. 45, No. 52, MA7, MA8, MA100, No. 2200B, and the like (all of which are manufactured by Mitsubishi Chemical Corporation), Raven 5750, Raven 5250, Raven 5000, Raven 3500, Raven 1255, Raven 700, and the like (all of which are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all of which are manufactured by CABOT JAPAN K.K.), and Color Black FW1, Color Black FW2, Color Black FW2V, Color Black FW18, Color Black FW200, Color Black 5150, Color Black S160, Color Black 5170, Printex 35, Printex U, Printex V, Printex 140U, Special Black 6, Special Black 5, Special Black 4A, and Special Black 4 (all of which are manufactured by Degussa).

Although the pigment used in the orange ink composition is not particularly limited, examples thereof include C.I. Pigment Orange 5, 43, and 62. Note that the hue angle (∠H°) of the orange ink composition is preferably from 30° to 80°.

Although the pigment used in the red ink composition is not particularly limited, examples thereof include C.I. Pigment Red 17, 49:2, 112, 117, 175, 177, 178, 188, 254, 255, 264, and 149. Note that the hue angle (∠H°) of the red ink composition is preferably from 0° to 30°.

Although the pigment used in the green ink composition is not particularly limited, examples thereof include C.I. Pigment Green 7 and 36. Note that the hue angle (∠H°) of the green ink composition is preferably from 110° to 230°.

Although the pigment used in the blue ink composition is not particularly limited, examples thereof include C.I. Pigment Blue 21, 22, 60, and 64, and C.I. Pigment Violet 3, 19, 23, 32, 36, and 38. Note that the hue angle (∠H°) of the blue ink composition is preferably from 260° to 330°.

Examples of the dye include acid dyes such as C.I. Acid Yellow, C.I. Acid Red, C.I. Acid Blue, C.I. Acid Orange, C.I. Acid Violet, C.I. and Acid black; basic dyes such as C.I. Basic Yellow, C.I. Basic Red, C.I. Basic Blue, C.I. Basic Orange, C.I. Basic Violet, and C.I. Basic Black; direct dyes such as C.I. Direct Yellow, C.I. Direct Red, C.I. Direct Blue, C.I. Direct Orange, C.I. Direct Violet, and C.I. Direct Black; reactive dyes such as C.I. Reactive Yellow, C.I. Reactive Red, C.I. Reactive Blue, C.I. Reactive Orange, C.I. Reactive Violet, and C.I. Reactive Black; and dispersion dyes such as C.I. Disperse Yellow, C.I. Disperse Red, C.I. Disperse Blue, C.I. Disperse Orange, C.I. Disperse Orange, and C.I. Disperse Black. One kind of the coloring materials may be used alone, or two or more kinds of the coloring materials may be used together.

In a case in which the coloring material is a pigment, it is possible to use the coloring material in a state of a pigment dispersion. The pigment dispersion may include a dispersant as needed in addition to the pigment and the solvent. Examples of the solvent include hydrophilic solvents such as water and diethylene glycol. Also, examples of the dispersant include a styrene-acrylic acid copolymer. Although not particularly limited, the acid value of the dispersant is preferably equal to or greater than 20 mgKOH/g in terms of dispersing properties.

Although the content of the coloring material in each colored ink composition may differ from each other, the content thereof is preferably from 0.1% by mass to 10% by mass, is more preferably from 0.5% by mass to 7% by mass, is further preferably from 1% by mass to 4% by mass, and is further preferably from 1.5% by mass to 4% by mass with respect to the total amount of the ink composition.

Solvent

Examples of the solvent include water and organic solvent. The content of water is preferably from 50% by mass to 80% by mass, is more preferably from 55% by mass to 75% by mass, and is further preferably from 60% by mass to 70% by mass with respect to the total amount of the ink composition.

Although the organic solvent is not particularly limited, specific examples thereof include alcohols and glycols such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, dethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol. One kind of the organic solvents may be used alone, or two or more kinds of the organic solvents may be used in combination.

The content of the organic solvent is preferably from 5% by mass to 40% by mass, is more preferably from 10% by mass to 35% by mass, and is further preferably from 15% by mass to 30% by mass with respect to the total amount of the ink composition.

Nitrogen-Containing Solvent

In addition, it is also preferable to use a nitrogen-containing solvent as the organic solvent. By including the nitrogen-containing solvent, abrasion resistance tends to be further improved even in a case in which the heating temperature is low due to an effect of promoting softening of resin particles by the nitrogen-containing solvent. In a case in which the recording medium is a low-absorbable recording medium or a non-absorbable recording medium, adhesiveness tends to be further improved by an effect of softening the surface of the recording medium. Although the nitrogen-containing solvent is not particularly limited, examples thereof include a pyrrolidone-based solvent, an imidazolidinone-based solvent, an amide ether-based solvent, a pyridine-based solvent, a pyrazine-based solvent, and a pyridine-based solvent.

Preferable examples of the nitrogen-containing solvent include an amide-based solvent. Examples of the amide-based solvent include a cyclic amide-based solvent and an acyclic amide-based solvent. Examples of the cyclic amide-based solvent include a pyrrolidone-based solvent as described above. Examples of the acyclic amide-based solvent include an amide ether-based solvent as described above. Among them, the pyrrolidone-based solvent is preferably used, and examples thereof include 2-pyrrolidone, N-methyl-2-pyrrolidone, and N-ethyl-2-pyrrolidon. One kind of the nitrogen-containing solvents may be used alone, or two or more kinds of the nitrogen-containing solvents may be used together.

The content of the nitrogen-containing solvent is preferably from 3% by mass to 25% by mass, is more preferably from 5% by mass to 23% by mass, and is further preferably from 10% by mass to 21% by mass with respect to the total mass of the ink composition.

The content of the organic solvent other than the nitrogen-containing solvent in the organic solvent is preferably from 1% by mass to 20% by mass, is more preferably from 5% by mass to 20% by mass, and is further preferably from 8% by mass to 16% by mass. Among the organic solvents other than the nitrogen-containing solvent, polyols and alkylene glycol ethers are preferably used. Polyols are organic solvents, each of which has two or more hydroxyl groups in a molecule. The number of hydroxyl groups is preferably two or three. Alkyl glycol ethers are monoether or diether of alkylene glycol. Alkyl ether is preferable as ether, and alkyl ether having one to five carbon atoms is more preferably used. The number of carbon atoms of alkylene glycol is preferably from two to five.

An organic solvent with a standard boiling point from 180° C. to 280° C. is preferably included, an organic solvent with a standard boiling point from 200° C. to 260° C. is more preferably included, and an organic solvent with a standard boiling point from 210° C. to 250° C. is further preferably included. In this case, more excellent image quality of the image is achieved, which is preferable.

The content of the organic solvent is preferably equal to or less than 1% by mass, is more preferably equal to or less than 0.5% by mass, and is further preferably equal to or less than 0.1% by mass with respect to the composition with the standard boiling point of greater than 280° C., and the lower limit may be 0% by mass. In this case, more excellent image quality of the image is achieved, which is preferable.

Resin

Examples of the resin include resin that is dissolved in the ink composition or resin that is dispersed in the form of fine particles such as an emulsion. By using such resin, a recorded product with more excellent abrasion resistance tends to be obtained. In particular, use of such resin tends to contribute to improvement in bonding properties between the recording medium and an ink coated film (abrasion resistance). Although such resin is not particularly limited, examples thereof include acrylic resin, vinyl acetate resin, vinyl chloride resin, butadiene resin, styrene resin, polyester resin, crosslinked acrylic resin, crosslinked styrene resin, benzoguanamine resin, phenol resin, silicone resin, epoxy resin, urethane resin, paraffin resin, fluorine resin, and water-soluble resin, and copolymers obtained by combining monomers that form such resin. Although the copolymers are not particularly limited, examples thereof include styrene butadiene resin and styrene acrylic resin. As the resin, a polymer latex that includes such resin can be used. For example, polymer latexes that include fine particles of acrylic resin, styrene acrylic resin, styrene resin, crosslinked acrylic resin, and crosslinked styrene resin are exemplified. Note that one kind of the resin may be used alone or two or more kinds of the resin may be used together.

The acrylic resin is resin of a monomer or a copolymer obtained by using at least an acrylic monomer as a monomer. Examples of the acrylic monomer include (meth)acrylate, (meth)acrylic acid, acrylamide, and acrylonitrile. In a case in which the acrylic resin is a copolymer, examples thereof include acryl-vinyl resin using a vinyl-based monomer as another monomer, and in particular, styrene acryl resin using styrene as the vinyl-based monomer and the like are exemplified.

Acrylic resin, urethane resin, polyester resin, and the like are preferably used as the resin due to availability and because it is easy to obtain such resin that has desired properties.

The content of the resin is preferably from 1% by mass to 12.5% by mass, is more preferably from 2% by mass to 10% by mass, and is further preferably from 3% by mass to 7.5% by mass with respect to the total amount of the ink composition. If the content of the resin is equal to or greater than 1% by mass, abrasion resistance tends to be further improved as described above. If the content of the resin is equal to or less than 12.5% by mass, the viscosity of the ink tends to decrease, and excellent ejection stability and clogging recovery tend to be achieved.

Wax

Examples of the wax include a wax that is dissolved in the ink composition or a wax that is dispersed in the form of fine particles such as an emulsion. By using such a wax, a recorded product with more excellent abrasion resistance tends to be obtained. In particular, the wax tends to contribute to improvement in abrasion resistance by being localized on the surface of the ink coated film (at the interface between the air and the ink coated film) on the recording medium. Although such a wax is not particularly limited, examples thereof include an ester wax of a higher fatty acid and higher monohydric alcohol or dihydric alcohol (preferably, monohydric alcohol), a paraffin wax, a microcrystalline wax, and an olefin wax, and mixtures thereof.

The content of the wax is preferably from 0.1% by mass to 5% by mass, is more preferably from 0.2% by mass to 4% by mass, and is preferably from 0.3% by mass to 3% by mass with respect to the total amount of the ink composition. If the content of the wax is equal to or greater than 0.1% by mass, abrasion resistance tends to be further improved as described above. If the content of the wax is equal to or less than 5% by mass, the viscosity of the ink tends to decrease, and excellent ejection stability and clogging recovery tend to be achieved.

Surfactant

Although the surfactant is not particularly limited, examples thereof include an acetylene glycol-based surfactant, a fluorine-based surfactant, and polysiloxane-based surfactant.

Although the acetylene glycol-based surfactant is not particularly limited, preferable examples include one or more kind selected from an alkylene oxide adduct of 2,4,7,9-tetramethyl-5-decin-4,7-diol and 2,4,7,9-tetramethyl-5-decin-4,7-diol, and an alkylene oxide adduct of 2,4-dimethyl-5-decin-4-ol and 2,4-dimethyl-5-decin-4-ol. Although commercially available acetylene glycol-based surfactant is not particularly limited, examples thereof include Olfine 104 series, E series such as Olfine E1010, Surfynol 465, and Surfynol 61 (names of products manufactured by Nissin Chemical Industry Co., Ltd.). One kind of the acetylene glycol-based surfactants may be used alone, or two or more kinds of the acetylene glycol-based surfactants may be used together.

Although the fluorine-based surfactant is not particularly limited, examples thereof include a perfluoroalkyl sulfonic acid salt, a perfluoroalkyl carboxylic acid salt, perfluoroalkyl phosphoric acid ester, a perfluoroalkyl ethylene oxide adduct, perfluoroalkyl betaine, and a perfluoroalkyl amine oxide compound. Although commercially available fluorine-based surfactants are not particularly limited, and examples thereof include S-144 and S-145 (manufactured by AGC Inc.); FC-170C, FC-430, and Fluorad FC4430 (manufactured by Sumitomo 3M Limited.); FSO, FSO-100, FSN, FSN-100, and FS-300 (manufactured by Dupont); and FT-250 and 251 (manufactured by NEOS Company Limited). One kind of the fluorine surfactants may be used alone or two or more kinds of the fluorine surfactants may be used together.

Examples of the silicone-based surfactant include a polysiloxane compound and polyether-modified organosiloxane. Although commercially available products of the silicone-based surfactant are not particularly limited, specific examples thereof include BYK-306, BYK-307, BYK-333, BYK-341, BYK-345, BYK-346, BYK-347, BYK-348, and BYK-349 (all of which are names of products manufactured by BYK Additives & Instruments) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of which are names of products manufactured by Shin-Etsu Chemical Co., Ltd.).

The content of the surfactant is preferably from 0.1% by mass to 3% by mass, is more preferably from 0.2% by mass to 2% by mass, and is further preferably from 0.3% by mass to 1.5% by mass with respect to the total amount of the ink composition.

Antifoaming Agent

Although the antifoaming agent is not particularly limited, and examples thereof include a silicone-based antifoaming agent, a polyether-based antifoaming agent, a fatty acid ester-based antifoaming agent, and an acetylene glycol-based antifoaming agent. Commercially available antifoaming agents include BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, BYK-1770 (all of which are names of products manufactured by BYK Additives & Instruments), Surfynol DF37, DF110D, DF58, DF75, DF220, MD-20, Environgem AD01 (all of which are names of products manufactured by Nissin Chemical Industry Co., Ltd.). One kind of the antifoaming agents may be used alone, or two or more kinds of the antifoaming agents may be mixed and used.

The content of the antifoaming agent is preferably from 0.03% by mass to 0.7% by mass, is more preferably from 0.05% by mass to 0.5% by mass, and is further preferably from 0.08% by mass to 0.3% by mass with respect to the total amount of the ink composition.

Other Constituents

The ink compositions used in the embodiment may additionally include various additives such as a dissolution aid, a viscosity adjusting agent, a pH adjusting agent, an antioxidant, an antiseptic, a fungicide, a corrosion inhibitor, and a chelating agent for capturing metal ions that affect dispersion.

Recording Medium

Examples of the recording medium include an absorbable recording medium, a low-absorbable recording medium, and a non-absorbable recording medium. Among them, the low-absorbable recording medium or the non-absorbable recording medium is preferably used since it is possible to create a recorded product that is useful for display or the like. Since roughness, density irregularity, and the color difference tend to occur when such a recording medium is used, the invention is thus particularly useful.

Although the absorbable recording medium is not particularly limited, examples thereof include ordinary paper such as an electronic photograph sheet with high permeability of ink compositions and an ink jet sheet (ink jet dedicated paper including an ink absorbing layer formed with silica particles or alumina particles or an ink absorbing layer formed with a hydrophilic polymer such as polyvinyl alcohol (PVA) or polyvinyl pyrrolidone (PVP).

Although the low-absorbable recording medium is not particularly limited, examples thereof include coating paper including a coating layer for receiving ink on the surface. Although the coated paper is not particularly limited, examples thereof include print paper such as art paper, coated paper, and matte paper, and wall paper.

Although the non-absorbable recording medium is not particularly limited, examples thereof include: a film or a plate made of plastic such as polyvinyl chloride, polyethylene, polypropylene, polyethylene terephthalate (PET), polycarbonate, polystyrene, or polyurethane; a plate made of metal such as iron, silver, copper, or aluminum; a metal plate or a film made of plastic manufactured by depositing these various kinds of metal, a plate of an alloy such as stainless or brass; and a recording medium obtained by bonding (coating) a film of plastic such as polyvinyl chloride, polyethylene, polypropylene, polyethylene terephthalate (PET), polycarbonate, polystyrene, or polyurethane to a base material such as paper, cloth, or a film.

Here, the "low-absorbable recording medium" or the "non-absorbable recording medium" represents a recording medium of a water absorption amount of equal to or less than 10 mL/m$^2$ in 30 msec from the start of contact in the Bristow method. The Bristow method is a method that has the most widely been distributed as a method of measuring the liquid absorption amount in a short time and has also been employed by JAPAN TAPPI. Details of the test method are described in Standard No. 51 "Paper and sheet paper-Liquid absorbability test method-Bristow method" in "JAPAN TAPPI paper pulse test method 2000". Note that the low-absorbable recording medium is a recording medium with the aforementioned water absorption amount of equal to or greater than 5 mL/m$^2$ and equal to or less than 10 mL/m$^2$. Meanwhile, the absorbable recording medium is a recording medium with the aforementioned water absorption amount of greater than 10 mL/m$^2$.

The non-absorbable recording medium or the low-absorbable recording medium can be classified depending on wettability of the recording surface with respect to water. For example, the recording medium can be characterized by dropping 0.5 µL of water droplet to the recording surface of the recording medium and measuring a decrease rate of the contact angle (comparison with a contact angle at 0.5 milliseconds after landing and a contact angle at 5 seconds). More specifically, non-absorbability of the "non-absorbable recording medium" represents the aforementioned decrease rate of less than 1%, and low-absorbability of the "low-absorbable recording medium" represents the aforementioned decrease rate of equal to or greater than 1% and less than 5% as characteristics of the recording medium. Absorbable represents the aforementioned decrease rate of equal to or greater than 5%. Note that the contact angle can be measured using a portable contact angle meter PCA-1 (manufactured by Kyowa Interface Science, Inc.) or the like.

Processing Solution Adhesion Process

The processing solution adhesion process is a process of causing a processing solution that contains a coagulant for coagulating constituents of the colored ink compositions to adhere to a recording medium. Note that the processing solution adhesion process is performed at least on a region to which the colored ink composition has adhered or a region to which the colored ink compositions are to adhere. By providing the processing solution adhesion process, the constituents of the colored ink composition tends to be coagulated on the surface of the recording medium, and it is possible to fix the constituents of the ink on the recording medium early. It is possible to suppress density irregularity and to reduce the color difference, which is resulted from occurrence of density irregularity caused by bleeding of ink droplets on the recording medium in a case in which no processing solution is used, by using the processing solution. Also, it is possible to minimize early fixation of the ink by heating the recording medium to reduce density irregularity, and as a result, it is possible to reduce the color difference, by using the processing solution.

However, there may be a case in which a color difference occurs even in a case in which the processing solution is used. This is estimated to be because ink droplets are coagulated early on the recording medium with the processing solution, a different landing order of the respective color between the main scanning thus affects the color difference, and a difference in how the ink droplets are coagulated with the processing solution between the main scanning affects the color difference. In a case in which the process of heating and drying the processing solution that has adhered to the recording medium is provided, it is estimated that irregularity in how the processing solution is dried tends to occur depending on location, and this affects how the ink is coagulated if there is heating temperature irregularity depending on locations on the recording medium.

As a method of causing the processing solution to adhere, the processing solution may be applied using a bar coater, a roll coater, a spray, or the like in addition to the method of causing the processing solution to adhere using the ink jet scheme in a manner similar to that described above. Note that a method that is similar to the aforementioned method of ejecting the ink compositions can be exemplified as the ink jet scheme.

The processing solution adhesion process may be performed before or after the ink adhesion process. In a case in which the processing solution adhesion process is performed before the ink adhesion process, the ink adhesion process may be performed before the processing solution is dried or after the processing solution is dried. At this time, the interval before the adhesion of the ink compositions after the adhesion of the processing solution is preferably within 20 seconds. The recording medium may be heated in order to dry the adhering processing solution before the adhesion of the ink. The surface temperature of the recording medium at the time of the adhesion of the processing solution and/or from the adhesion of the processing solution to the adhesion of the ink may be within the aforementioned range of the surface temperature of the recording medium at the time of the adhesion of the ink.

Further, in a case in which the processing solution adhesion process is performed after the ink adhesion process, the processing solution adhesion process is preferably performed before the ink compositions are dried.

The processing solution adhesion process may have a process of drying the processing solution that has adhered to the recording medium. As a drying unit, a platen heater, a warm wind heater, an IR heater, or the like provided with a warming function, for example, or a blower or the like with no warming function is used. Note that the drying temperature can be set to 70° C. to 110° C.

A region in which the amount of the adhering processing solution is from 5% by mass to 50% by mass with respect to the amount of the adhering colored ink composition is preferably included in the recording region to which the colored ink composition and the processing solution are caused to adhere, a region in which the amount of the adhering processing solution is from 5% by mass to 40% by mass is more preferably included therein, and a region in which the amount of the adhering processing solution is from 5% by mass to 30% by mass is further preferably included therein. If the amount of adhesion is equal to or greater than the aforementioned range, density irregularity and roughness of the image tend to be improved, and the color difference tends to be further suppressed. Also, if the amount of adhesion is equal to or less than the aforementioned range, it is possible to prevent coagulation of the ink from excessively advancing, to prevent roughness of the image from increasing, and to prevent the color difference from increasing.

Further, the amount of the adhering processing solution in the region, in which the amount of the adhering processing solution with respect to the amount of the adhering colored ink composition is the maximum, in the recording region preferably falls within the aforementioned range in terms of the aforementioned points.

Processing Solution

The processing solution is not particularly limited as long as the processing solution includes the coagulant for coagulating the constituents of the ink composition. Water, an organic solvent, an antifoaming agent, and a surfactant may be included as needed. A water-based processing solution is preferably used. As constituents that may be included in the processing solution other than the coagulant, constituents other than the coloring agent that may be included in the aforementioned colored ink compositions are exemplified, and the types, content, and the like thereof may be set independently from those of the colored ink compositions. The processing solution is not a composition used to color the recording medium. The content of the coloring material in the processing solution is preferably equal to or less than 0.1% by mass, is more preferably equal to or less than 0.05% by mass, and is further preferably equal to or less than 0.01% by mass, and the lower limit is 0.00% by mass.

Coagulant

The coagulant is not particularly limited as long as the coagulant coagulates the constituents of the ink composition, and examples thereof include polyvalent metal salts, organic acids or salts thereof, and cationic resin. One kind of the coagulants may be used alone, or two or more kinds of the coagulants may be used together.

Although the polyvalent metal salts are not particularly limited, examples thereof include polyvalent metal salts of inorganic acids and polyvalent metal salts of organic acids. Although the polyvalent metal is not particularly limited, examples thereof include alkali earth metal of a group 2 in the periodic table (for example, magnesium and calcium), transition metal of a group 3 in the periodic table (for example, lanthanum), earth metal from a group 13 in the periodic table (for example, aluminum), and lanthanides (for example, neodymium). As salts of the polyvalent metal, carboxylic acid salts (such as a formic acid, an acetic acid, and a benzoic acid salt), a sulfuric acid salt, a nitric acid salt, a chloride, and a thiocyanic acid salt are preferably used. Among them, preferable examples include calcium salts or magnesium salts of the carboxylic acids (such as a formic acid, an acetic acid, and a benzoic acid salt), calcium salts or magnesium salts of the sulfuric acid, calcium salts or magnesium salts of the nitric acid salt, calcium chloride, magnesium chloride, and calcium salts or magnesium salts of the thiocyanic acid. Note that one kind of the polyvalent metal salts may be used alone, or two or more kinds of the polyvalent metal salts may be used together.

Although the organic acids are not particularly limited, examples thereof include an acetic acid, a phosphoric acid, an oxalic acid, a malonic acid, and a citric acid. Among them, a monovalent carboxylic acid or a carboxylic acid with a valence of two or more is preferably used. The organic acid may be in a state of a salt. Note that one kind of the organic acids or salts thereof may be used alone, or two or more kinds of the organic acids or salts thereof may be used together. Note that the organic acids or the salts thereof that are polyvalent metal salts are assumed to be included in the polyvalent metal salts.

Although the cationic resin is not particularly limited, examples thereof include an amine-based resin. Any amine-based resin may be used as long as the amine-based resin has an amino base in the structure. Examples of the amine-based resin include amine-based resin such as an amine/epichlorohydrin condensation-type polymer, a polyallylamine, a polyallyamine derivative. The cationic resin that is soluble in the processing solution or the cationic resin that is dispersed in the processing solution in the state of a resin emulsion or the like is preferably used, and the former is more preferably used.

The content of the coagulant is preferably from 1% by mass to 20% by mass and is more preferably from 3% by mass to 10% by mass with respect to the total amount of the processing solution. If the content of the coagulant falls within the aforementioned range, more excellent bleeding resistance, filling properties, and abrasion resistance of the obtained recorded product tend to be achieved.

Water

The content of water is preferably from 55% by mass to 85% by mass, is more preferably from 60% by mass to 80% by mass, and is further preferably 65% by mass to 75% by mass with respect to the total amount of the processing solution.

Organic Solvent

As the organic solvent included in the processing solution, organic solvents that are similar to those exemplified for the ink composition can be exemplified. One kind of the organic solvents may be used alone, or two or more kinds of the organic solvents may be used in combination. The content of the organic solvent is preferably from 10% by mass to 40% by mass, is more preferably from 15% by mass to 35% by mass, and is further preferably from 20% by mass to 30% by mass with respect to the total amount of the processing solution.

In addition, the processing solution may include a nitrogen-containing solvent as the organic solvent. The content of the nitrogen-containing solvent is preferably from 3% by mass to 25% by mass, is more preferably from 5% by mass to 22% by mass, and is further preferably from 8% by mass to 20% by mass with respect to the total amount of the processing solution. As the nitrogen-containing solvent, the aforementioned nitrogen-containing solvent that may be included in the colored ink composition can be used independently from that included in the colored ink composition.
Surfactant As the surfactant included in the processing solution, the surfactants that are similar to those exemplified for the ink composition can be exemplified. The content of the surfactant is preferably from 0.1% by mass to 3% by mass, is more preferably from 0.2% by mass to 2% by mass, and is further preferably from 0.3% by mass to 1.5% by mass with respect to the total amount of the processing solution. If the content of the surfactant falls within the aforementioned range, wettability of the processing solution tends to be improved.
Antifoaming Agent As the antifoaming agent that is included in the processing solution, the antifoaming agent that are similar to those exemplified for the ink composition can be exemplified. The content of the antifoaming agent is preferably from 0.03% by mass to 0.7% by mass, is more preferably from 0.05% by mass to 0.5% by mass, and is further preferably from 0.08% by mass to 0.3% by mass with respect to the total amount of the processing solution.
Recording Apparatus The recording apparatus used in the embodiment is adapted to perform record by the aforementioned recording method and is not particularly limited as long as the recording apparatus has an ink jet head that has nozzles for ejecting the ink compositions to a recording medium and a mechanism to cause the processing solution to adhere. A schematic sectional view of the recording apparatus is illustrated in FIG. 1. As illustrated in FIG. 1, the recording apparatus 1 includes a recording head 2, an IR heater 3, a platen heater 4, a drying heater 5, a cooling fan 6, a preheater 7, and fans 8.

The recording head 2 is adapted to eject the ink compositions to the recording medium. A known scheme in the related art can be used for the recording head 2, and examples thereof include a head that ejects liquid droplets using oscillation of a piezoelectric element, that is, a head that forms ink droplets by mechanical deformation of an electrostrictive element. The IR heater 3 and the platen heater 4 are adapted mainly to heat the recording medium 10 and can also heat the recording head. It is possible to heat the recording medium from the side of the recording head 2 with the IR heater 3. In this manner, it is possible to heat the recording medium on the side of the recording head 2 and on the opposite side using the platen heater 4. The platen heater 4 may be formed by aligning a plurality of heater elements in the main scanning direction. This is preferable since it is easy to obtain and manufacture the platen heater. In contrast, temperature irregularity tends to occur in the heating in the main scanning direction. The drying heater 5 is adapted to dry the recording medium to which the ink compositions have adhered. By heating the recording medium on which an image has been recorded, moisture and the like included in the ink composition quickly evaporates and flies, and a coated film is formed with the resin included in the ink composition. In this manner, the dried ink is firmly fixed (bonded) on the recording medium, and an image with excellent abrasion resistance and high image quality can be obtained in a short time. The recording medium 10 is transported from the right to the left in the drawing during the recording.

The recording apparatus 1 may have cooling fan 6. It tends to be possible to form the coated film with satisfactory adhesiveness on the recording medium by cooling the ink compositions on the recording medium with the cooling fan 6 after the drying.

In addition, the recording apparatus 1 may include a preheater 7 that heats (preheats) the recording medium in advance before the ink compositions are ejected to the recording medium. By preheating the recording medium before the ejection of the ink compositions, it tends to be possible to form an image with less bleeding and high image quality on a recording medium, in particular, a non-absorbable or low-absorbable recording medium.

The recording head 2 is mounted on a carriage 9. The carriage 9 performs scanning (main scanning) of ejecting the ink compositions from the head while moving in the closest-furthest direction in the drawing and causing the ink compositions to adhere to the recording medium that the head faces. Recording is performed by alternately repeating the scanning and transporting (sub scanning) of the recording medium 10. That is, a serial-type recording method in which recording is performed by performing the scanning a plurality of times is performed.

Figure 3:
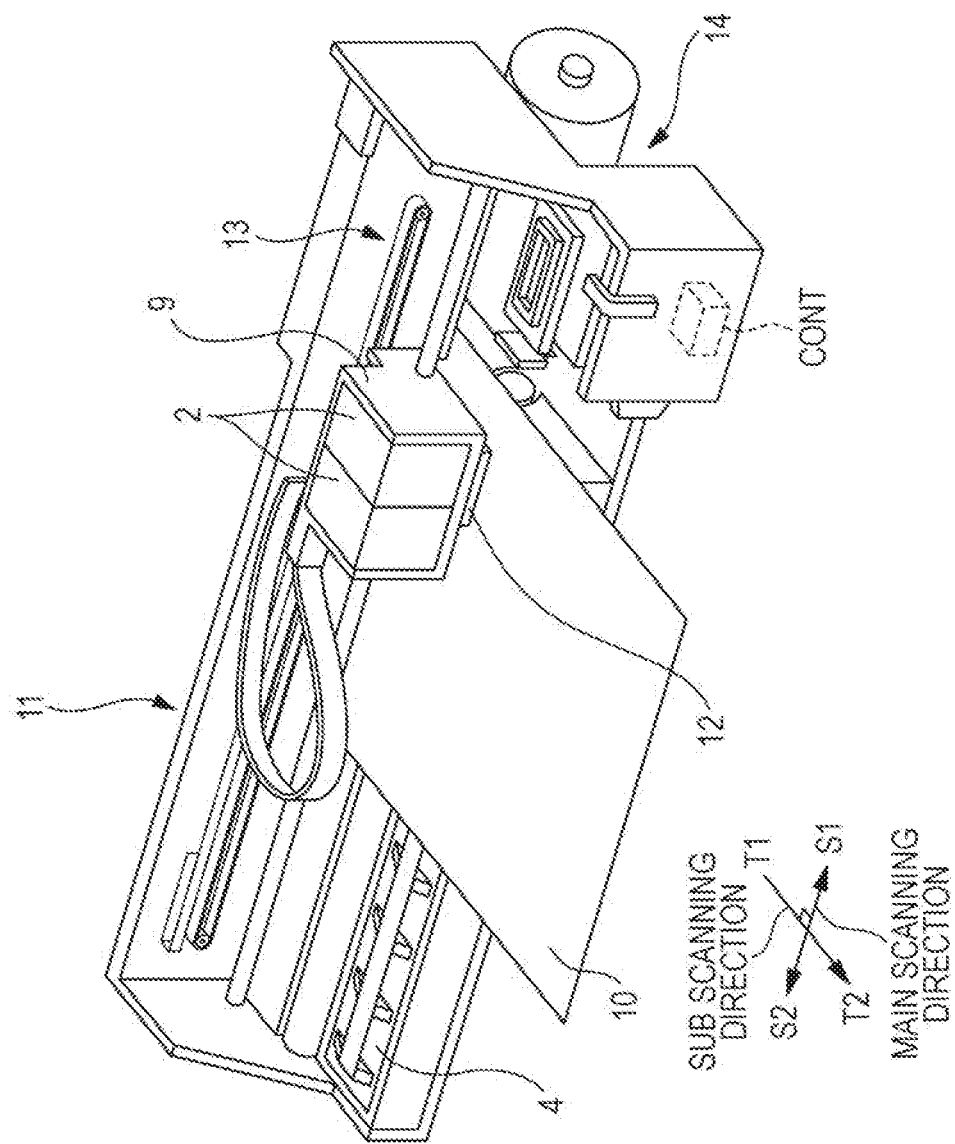
FIG. 3 is a schematic perspective view illustrating a configuration example in the surroundings of the carriage of the recording apparatus that is used in the embodiment.

FIG. 3 is a perspective view illustrating an example of a configuration in the surroundings of the carriage in the recording apparatus in FIG. 1. The configuration in the surroundings of the carriage 11 has a carriage 9, an ink jet head 2 that is mounted on the carriage 9, a member 12 including nozzles that is a part of the ink jet head 2 and ejects ink, an ink accommodation body (not illustrated), and an ink supply path (not illustrated) such as an ink supply tube that supplies ink from the ink accommodation body to the ink jet head 2. The ink accommodation body may be provided at a location other than the carriage 9 or may be provided in the carriage. In addition, the ink accommodation body includes a platen 4, which is disposed below the carriage 9, to which the recording medium 10 is transported, a carriage moving mechanism 13 that moves the carriage 9 relative to the recording medium 10, a transport mechanism 14 that is a roller for transporting the recording medium 10 in the sub scanning direction (transport direction), and a control unit CONT that controls operations of the carriage 9 and the like. The direction S1-S2 is the main scanning direction while the direction T1→T2 is the sub scanning direction. Note that the scanning is performed on any side in the main scanning direction (the left-right direction of the apparatus) in the scanning performed once.

Figure 2A:
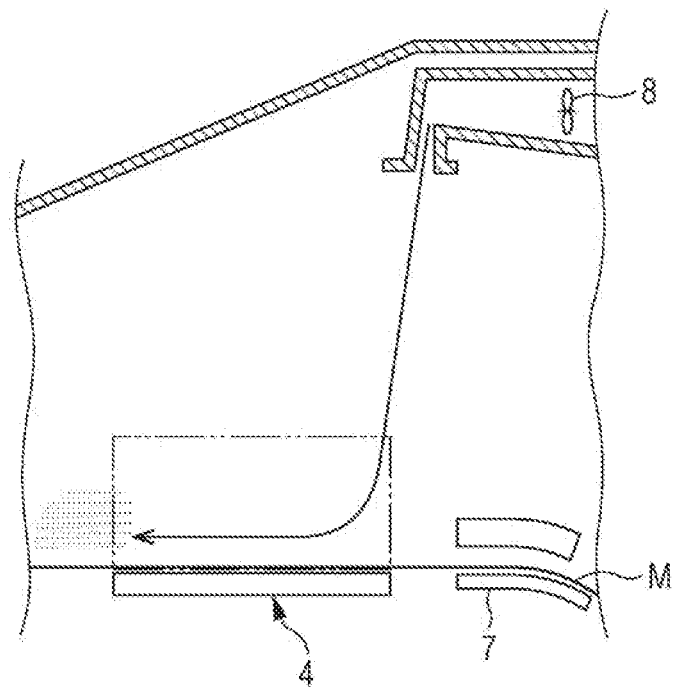
FIGS. 2A and 2B are partial side views of the recording apparatus in an ink adhesion process, where
Figure 2B:
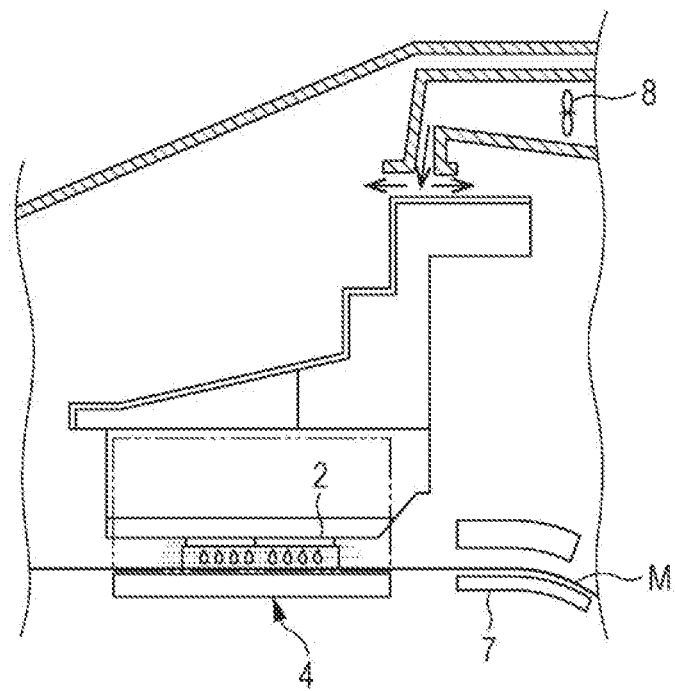

Further, the recording apparatus 1 in FIG. 1 includes fans 8 for feeding wind to the surface of the recording medium in terms of efficient drying of the ink compositions and adjustment of the temperatures of the recording medium and the nozzle plane. In order to describe the fans 8 in more detail, description will be given with reference to FIGS. 2A and 2B. In FIGS. 2A and 2B, the recording head 2 is mounted on the carriage and ejects the ink compositions from the head while moving in the main scanning direction that is the closest-furthest direction in the drawing. FIG. 2A is a diagram illustrating a state in which wind at a location where there is no carriage in the main scanning direction (the closest-furthest direction in the drawing) flows to the recording medium in the main scanning of the carriage, and FIG. 2B illustrates a state in which wind at a location where there is a carriage does not flow directly to the recording medium.

The plurality of fans 8 are provided in line in the width direction (the main scanning direction) of the recording medium 10 such that it is possible to constantly feed wind from an end to an end of the width of the recording medium 10. In FIG. 2A, wind hits the surface of the recording medium 10. Since the hitting angle inclines in the left direction in the drawing with respective to the surface of the recording medium, the orientation of the wind changes in the left direction of the drawing after hitting the surface, and the wind is fed to the downstream side in the transport direction of the recording medium in parallel to the surface of the recording medium in the region, to which the ink has adhered, on the recording medium. In this manner, it is possible to promote drying of the ink in the region, to which the ink has adhered, on the recording medium.

Figure 4:
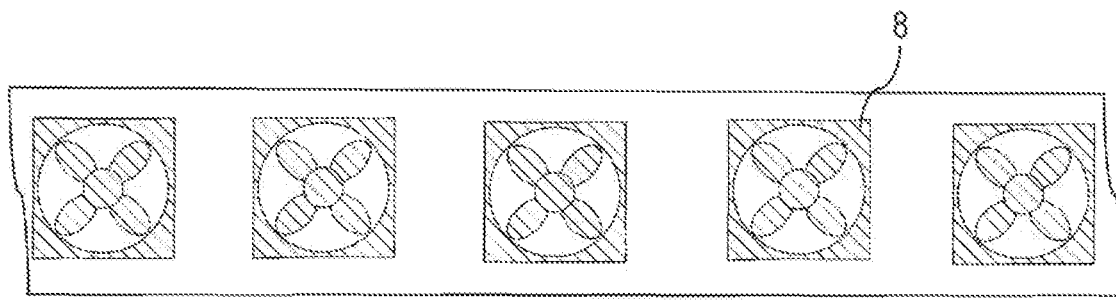
FIG. 4 is a front view illustrating an example of a fan that the recording apparatus that is used in the embodiment has.

FIG. 4 is a diagram of the fans 8 in FIGS. 2A and 2B when seen from the front of the fans. As illustrated in the drawing, the plurality of fans 8 are provided in line in the width direction of the recording medium.

Meanwhile, wind hits a windbreak member provided above the carriage, separates into the left-right direction in the drawing, changes the orientation, and does not hit directly the surface of the recording medium in FIG. 2B. In this manner, it is possible to reduce influences of clogging and landing position deviation due to the wind hitting the nozzles or flying ink droplets at the location where there is a carriage.

However, the wind fed in parallel to the surface of the recording medium slightly varies in some cases in FIG. 2A, and this affects the landing positions due to blowing of the wind from the side direction to the recording head 2 even at the location where there is a carriage. Also, there is a case in which the wind that has hit the windbreak member and has changed the orientation flows in an unintended direction, and similar influences slightly occur in FIG. 2B.

Note that the fans 8 in FIGS. 2A and 2B are one mode of the wind feeding mechanism that feeds wind to the recording medium, and the wind feeding mechanism is not limited thereto as long as the wind feeding mechanism can feed wind to the recording medium. A mode in which a wind feeding port is laterally directed such that wind is caused to flow to an upper layer of the recording medium or a mode in which wind is caused to hit the ink adhesion region on the surface of the recording medium from the upper direction is considered as another mode.

Number of Times of Scanning

The number of times of scanning is also referred to as the number of passes. The number of times of scanning in which a nozzle group used for performing recording with a certain ink composition faces and passes through a certain position, to which the recoding is performed, on the recording medium is referred to as the number of times of scanning with the ink composition. The nozzle group is a group of nozzles, such as a nozzle array aligned in the sub scanning direction of the ink jet head and is adapted to eject the ink composition for recording. The number of times of main scanning can be increased by reducing the distance of the sub scanning performed once or can be reduced by increasing the distance. The number of times of scanning can be set to eight (passes) by reducing the distance of the sub scanning performed once to one eighth of the length of the nozzle group in the sub scanning direction, for example. The number of times of scanning is equal to or greater than one, is preferably from two to twenty, and is more preferably from four to ten. The larger number of times of main scanning is more preferable since it is possible to increase the total amount of the ink compositions that are caused to adhere and it is possible to cause the ink compositions in a divided manner through scanning performed a plurality of times. Meanwhile, the smaller number of times of scanning is preferable since a recording speed is high.

Other Embodiments

Other embodiments of the invention are as follows.

A recording method includes: an ink adhesion process of ejecting colored ink compositions that include a cyan ink composition, a magenta ink composition, a yellow ink composition, and a special color ink composition with a hue angle that is different from those of the respective ink compositions from an ink jet head and causing the colored ink compositions to adhere to a recording medium; and a processing solution adhesion process of causing a processing solution that contains a coagulant for coagulating constituents of the colored ink compositions to adhere to the recording medium, the ink adhesion process is performed by performing scanning, in which the colored ink compositions are ejected while a relative position of the ink jet head with respect to the recording medium is changed in a scanning direction, a plurality of times, and a difference in surface temperatures of the recording medium when the colored ink is caused to adhere in the ink adhesion process is from 1° C. to 10° C.

In another embodiment described above, it is not necessary that the maximum distance of the scanning performed once is equal to or greater than 50 cm in the ink adhesion process in the aforementioned embodiment, and instead, the difference of the surface temperature of the recording medium when the colored ink is caused to adhere in the in adhesion process is from 1° C. to 10° C. Another embodiment described above is achieved by paying attention to the fact that a difference occurs in the surface temperature of the recording medium as one of reasons of the color difference occurring in the recorded product in the ink adhesion process as described above. According to the embodiment, excellent reduction of density irregularity and reduction of the color difference can be achieved even in a case in which the difference of the surface temperature of the recording medium falls within a predetermined range, which is preferable. It is more preferable that the difference of the surface temperature of the recording medium fall within the aforementioned range. Another embodiment described above can be similar to the aforementioned embodiment for configurations other than the aforementioned configuration and may further include other configurations that the aforementioned embodiment has.

EXAMPLES

Hereinafter, the invention will be described more specifically using examples and comparative examples. The invention is not limited by the following examples.

Materials for Ink Compositions

Main materials of the ink compositions and the processing solution used in examples, comparatives, and reference examples described below are as follows.

Pigment Dispersion
 See Fabrication Example 1 below.
Organic Solvent
 Dipropylene glycol dimethyl ether
 Propylene glycol
 2-pyrrolidone
Coagulant
 Calcium acetate monohydrate
 Acetic acid
 Cationmaster PD-7 (manufactured by Yokkaichi Chemical Company, Limited; cationic resin: amine//epichlorohydrin condensation polymer)

Resin
  St-Ac resin emulsion (see Fabrication Example 2 below)
Wax
  AQUACER 515 (manufactured by BYK Additives & Instruments; wax emulsion)
Surfactant
  Dinol 607 (manufactured by Air Products and Chemicals, Inc.; acetylenediol-based surfactant)
  BYK 348 (manufactured by BYK Additives & Instruments; silicone-based surfactant
Antifoaming Agent
  Surfynol DF110D (manufactured by Nissin Chemical Co., Ltd.; acetylenediol-based antifoaming agent)

Fabrication Example 1: Preparation of Pigment Dispersion 40 parts by mass of St-Ac acid copolymer (copolymer obtained by copolymerizing methacrylic acid/butyl acrylate/styrene/hydroxyethyl acrylate at a mass ratio of 25/50/15/10 with a weight average molecular weight of 7000; acid value: 150 mgKOH/g) was poured into a liquid obtained by mixing 7 parts by mass of potassium hydroxide, 23 parts by mass of water, and 30 parts by mass of triethylene glycol-mono-n-butyl ether, and the mixture was heated at 80° C. while being stirred, thereby preparing a resin aqueous solution.

20 parts by mass of pigment, 10 parts by mass of resin aqueous solution, 10 parts by mass of diethylene glycol, and 60 parts by mass of ion exchanged water were mixed and dispersed using a zirconium bead mill, thereby obtaining a pigment dispersion of each color. Note that the pigments used are as follows.
  Cyan pigment dispersion: C.I. Pigment Blue 15:3
  Magenta pigment dispersion: C.I. PR122
  Yellow pigment dispersion: C.I. PY74
  Orange pigment dispersion: C.I. PO43
  Red pigment dispersion: C.I. PR178
  Green pigment dispersion: C.I. PG7
  Blue pigment dispersion: C.I. PB60
  Black pigment dispersion: C.I. PBk7

Fabrication Example 2: Preparation of St-Ac Resin Emulsion 75 parts by mass of styrene, 0.5 parts by mass of acrylic acid, 14.5 parts by mass of methyl methacrylate, and 10 parts by mass of cyclohexyl methacrylate were emulsion-copolymerized, thereby obtaining an St-Ac resin emulsion. Note that Newcol NT-30 (manufactured by Nippon Nyukazai Co., Ltd.) was used as a surfactant for emulsion polymerization, and the amount of use thereof was set to 2 parts by mass with respect to the total amount of the monomer that was assumed to be 100 parts by mass.

Preparation of Ink Compositions and Processing Solution

The respective materials were mixed to satisfy the compositions in Tables 1 and 2 illustrated below and were sufficiently stirred, thereby obtaining the respective ink compositions and processing solution. Note that the unit of the numerical values in Tables 1 and 2 illustrated below is % by mass, and the sum is 100.0% by mass. The values for the pigment and the resin in the tables represent with % by mass in terms of solid content of the pigment and the resin in the ink.

A recording pattern was recorded with Ink 1 to 8 one by one with an amount of adhesion of 10 mg/inch2, the color of the pattern was measured, and a hue angle was obtained from the color measurement value. Equations for calculating the hue angle are as follows. Ink 1 to 8 had mutually different hue angles. Also, the hue angles are within the aforementioned preferable ranges of the hue angles for the ink of the respective colors.

$\angle H° = \tan{-1}(b*/a*)+180$ (in a case in which $a*<0$)

$\angle H° = \tan{-1}(b*/a*)+360$ (in a case in which $a*>0$)

TABLE 1

|  |  | Processing solution 1 | Processing solution 2 | Processing solution 3 |
|---|---|---|---|---|
| Solvent | Dipropylene glycol dimethyl ether | 15 | 15 | 15 |
|  | 2-pyrrolidone | 10 | 10 | 10 |
| Coagulant | Calcium acetate monohydrate | 5 |  |  |
|  | Acetic acid |  | 3 |  |
|  | Catiomaster PD-7 (solid content) |  |  | 4 |
| Antifoaming agent | DF110D | 0.1 | 0.1 | 0.1 |
| Surfactant | Dinol 607 | 1 | 1 | 1 |
|  | Pure water | Residual | Residual | Residual |
|  | Total | 100 | 100 | 100 |

TABLE 2

|  |  | Ink name |  |  |  |  |  |  |  |  |
|---|---|---|---|---|---|---|---|---|---|---|
|  |  | Ink 1 | Ink 2 | Ink 3 | Ink 4 | Ink 5 | Ink 6 | Ink 7 | Ink 8 | Ink 9 |
|  |  | Ink type |  |  |  |  |  |  |  |  |
|  |  | Cyan ink | Magenta ink | Yellow ink | Orange ink | Red ink | Green ink | Blue ink | Green ink | Black ink |
| Solvent | Propylene glycol | 5 | 5 | 5 | 5 | 5 | 5 | 5 | 7 | 5 |
|  | Dipropylene glycol dimethyl ether | 7 | 7 | 7 | 7 | 7 | 7 | 7 | 9 | 7 |
|  | 2-pyrrolidone | 13 | 13 | 13 | 13 | 13 | 13 | 13 | 9 | 13 |
| Pigment | Black pigment dispersion |  |  |  |  |  |  |  |  |  |
|  | Cyan pigment dispersion | 2 |  |  |  |  |  |  |  |  |
|  | Magenta pigment dispersion |  | 3 |  |  |  |  |  |  |  |
|  | Yellow pigment dispersion |  |  | 3.5 |  |  |  |  |  |  |

TABLE 2-continued

| | | Ink name | | | | | | | | |
|---|---|---|---|---|---|---|---|---|---|---|
| | | Ink 1 | Ink 2 | Ink 3 | Ink 4 | Ink 5 | Ink 6 | Ink 7 | Ink 8 | Ink 9 |
| | | Ink type | | | | | | | | |
| | | Cyan ink | Magenta ink | Yellow ink | Orange ink | Red ink | Green ink | Blue ink | Green ink | Black ink |
| | Orange pigment dispersion | | | | 3 | | | | | |
| | Red pigment dispersion | | | | | 2 | | | | |
| | Green pigment dispersion | | | | | | 3 | | 3 | |
| | Blue pigment dispersion | | | | | | | 2 | | |
| | Black pigment dispersion | | | | | | | | | 2 |
| Resin | St-Ac resin emulsion | 5 | 5 | 5 | 5 | 5 | 5 | 5 | 5 | 5 |
| | Wax emulsion | 2 | 2 | 2 | 2 | 2 | 2 | 2 | 2 | 2 |
| Antifoaming agent | DF110D | 0.1 | 0.1 | 0.1 | 0.1 | 0.1 | 0.1 | 0.1 | 0.1 | 0.1 |
| Surfactant | BYK348 | 1 | 1 | 1 | 1 | 1 | 1 | 1 | 1 | 1 |
| Pure water | | Residual | Residual | Residual | Residual | Residual | Residual | Residual | Residual | Residual |
| Total | | 100 | 100 | 100 | 100 | 100 | 100 | 100 | 100 | 100 |

Recording Method

A modified machine SC-S80650 (hereinafter, referred to as an "SC-S80650") (manufactured by Seiko Epson Corporation) that had a platen heater in which heater elements were arranged in line in the medium width direction and fans that are arranged in line in the width direction of the recording medium above the head was prepared. The ink jet head was of a serial type as illustrated in FIG. 1 and was able to perform recording with the ink in order from the ink jet head. The fans were caused to blow wind at the ordinary temperature (25° C.) from the upper side toward the recording medium.

Nozzle arrays (360 nozzles) of the ink jet head on the upstream side in the transport direction of the recording medium were filled with the aforementioned processing solution, and nozzle arrays of the ink jet head on the downstream side in the transport direction of the recording medium were filled with the respective ink compositions. Then, the processing solution was ejected from the ink jet head and was caused to adhere to a recording medium (manufactured by Ultraflex; JetFlex FL 80), and the ink compositions were then ejected and were caused to adhere to the recording medium.

The amounts of the adhering reaction solution in the table were represented with % by mass with respect to the total amount of the adhering ink compositions. Also, each of the volume of processing solution droplets and the volume of the ink droplets was set to 20 ng/dot, basic resolution was set to 720×720 dpi, and the dot density was adjusted, such that each amount of adhesion was able to be adjusted. Also, the number of times of scanning was set to eight passes for each composition. Finally, the recorded product was heated and dried at 95° C. for 30 seconds with a secondary heater located on the downstream side beyond the ink jet head.

A solid pattern for evaluating a color difference was recorded under the aforementioned recording conditions.

First, the amounts of ink of basic colors and a special color for adjusting a solid pattern with any of the recorded colors to be recorded were adjusted and decided for the respective examples. Target colors of solid patterns of the respective colors were set as follows.

Red color solid pattern (L*50, a*=40, b*=10, ∠H°=14)

Orange color solid pattern (L*50, a*=30, b*=30, ∠H°=45)

Blue color solid pattern (L*50, a*=40, b*=−40, ∠H°−1°=315)

Green color solid pattern (L*50, a*=−40, b*=10, ∠H°=166)

When the amounts of the adhering ink were decided, solid patterns for tests were recorded on the aforementioned recording medium, and the colors were measured. The colors were measured using Spectrolino manufactured by GretagMacbeth. The colors were measured on the basis of a CIELAB color system. The amounts of the adhering ink were adjusted and decided such that the hue angles (∠H°) of the color measurement values became the values of the aforementioned target colors. In this manner, the amounts of the respective adhering ink used to record the solid patterns of the respective colors were decided for the respective examples.

Note that in Reference Example 3, a pattern of a cyan color obtained by performing recording with the cyan ink alone was obtained, and the amount of adhesion was set to 10 mg/inch$^2$.

Solid patterns for evaluating color differences were successively recorded with the amounts of the adhering ink decided as described above and under the aforementioned recording conditions, thereby producing recorded products. Note that the solid patterns were recorded in the entire range, in which recording was able to be performed, in the lateral width direction of the medium and were recorded over the length of 1500 mm in the medium feeding direction. Note that the lateral width of the recording medium of the recording medium was adjusted by cutting or attaching the recording medium, and the maximum distances of the scanning performed once were adjusted to the values illustrated in Tables 3 and 4.

The types of the ink compositions used were as described in Tables 3 and 4.

In the aforementioned recording method, the plate heater was controlled such that the surface temperatures of the recording medium in the platen region that faced the head during recording were the heating temperatures in Tables 3 and 4. Specifically, in a case in which the surface temperature was set to be equal to or greater than 35° C., the surface temperature was adjusted by turning on the platen heater. In a case in which the surface temperature was set to be equal to or less than 25° C., the room temperature was adjusted without using the platen heater.

For the surface temperature of the recording medium, the temperatures of the entire region, which the head was able to face during the main scanning, on the recording medium supported by the platen were measured at intervals of 1 cm square and were regarded as the maximum temperature of the surface of the recording medium in the region during the recording. The measurement was performed using a non-contact-type thermometer. For the temperature measurement, recording was continuously performed for 1 hour under the aforementioned processing, the measurement was started 1 minute later than start of the recording, and the measurement was performed every 1 minute during the recording.

TABLE 3

|  | Comparative Example 1 | Example 1 | Comparative Example 2 | Example 2 | Comparative Example 3 | Example 3 | Comparative Example 4 | Example 4 |
|---|---|---|---|---|---|---|---|---|
| Processing solution | Processing solution 1 | | Processing solution 1 | | Processing solution 1 | | Processing solution 1 | |
| Amount of adhering processing solution (with respect to mass % of ink) | 10 | 10 | 10 | 10 | 10 | 10 | 10 | 10 |
| Ink set configuration ink name | 1, 2, 3 | 1, 2, 3, 7 | 1, 2, 3 | 1, 2, 3, 4 | 1, 2, 3 | 1, 2, 3, 5 | 1, 2, 3 | 1, 2, 3, 6 |
| Recorded color | Blue | | Orange | | Red | | Green | |
| Maximum distance of scanning performed once (cm) | 160 | | 160 | | 160 | | 160 | |
| Maximum time of scanning performed once (s) | 2.2 | | 2.2 | | 2.2 | | 2.2 | |
| Surface temperature of recording medium during recording (° C.) | 35 | | 35 | | 35 | | 35 | |
| Color difference evaluation | D | A | D | A | D | A | D | A |
| Abrasion resistance | A | A | A | A | A | A | A | A |
| Water friction resistance | B | B | B | B | B | B | B | B |
| Image quality roughness evaluation | B | A | B | A | B | A | B | A |
| Density irregularity | A | A | A | A | A | A | A | A |

|  | Comparative Example 5 | Example 5 | Comparative Example 6 | Example 6 | Example 7 | Example 8 | Example 9 |
|---|---|---|---|---|---|---|---|
| Processing solution | Processing solution 2 | | Processing solution 3 | | Processing solution 1 | Processing solution 1 | Processing solution 1 |
| Amount of adhering processing solution (with respect to mass % of ink) | 10 | 10 | 10 | 10 | 10 | 10 | 10 |
| Ink set configuration ink name | 1, 2, 3 | 1, 2, 3, 6 | 1, 2, 3 | 1, 2, 3, 6 | 1, 2, 3, 6 | 1, 2, 3, 6 | 1, 2, 3, 6 |
| Recorded color | Green | | Green | | Green | Green | Green |
| Maximum distance of scanning performed once (cm) | 160 | | 160 | | 160 | 160 | 160 |
| Maximum time of scanning performed once (s) | 2.2 | | 2.2 | | 2.2 | 2.2 | 2.2 |

TABLE 3-continued

|  | | | | | | |
|---|---|---|---|---|---|---|
| Surface temperature of recording medium during recording (° C.) | 35 | 35 | 25 | 22 | 45 | |
| Color difference evaluation | D | A | D | A | A | A | B |
| Abrasion resistance | A | A | A | A | B | C | A |
| Water friction resistance | B | B | B | A | C | D | A |
| Image quality roughness evaluation | B | B | C | B | B | C | A |
| Density irregularity | A | A | A | A | B | B | A |

TABLE 4

|  | Example 10 | Comparative Example 7 | Example 11 | Example 12 | Example 13 | Example 14 | Example 15 | Example 16 |
|---|---|---|---|---|---|---|---|---|
| Processing solution | Processing solution 1 | Processing solution 1 | | Processing solution 1 | Processing solution 1 | Processing solution 1 | Processing solution 1 | Processing solution 1 |
| Amount of adhering processing solution (with respect to mass % of ink) | 10 | 10 | 10 | 10 | 10 | 10 | 30 | 5 |
| Ink set configuration ink name | 1, 2, 3, 6 | 1, 2, 3 | 1, 2, 3, 6 | 1, 2, 3, 6 | 1, 2, 3, 6 | 1, 2, 3, 8 | 1, 2, 3, 6 | 1, 2, 3, 6 |
| Recorded color | Green | Green | | Green | Green | Green | Green | Green |
| Maximum distance of scanning performed once (cm) | 160 | 71 | | 170 | 198 | 160 | 160 | 160 |
| Maximum time of scanning performed once (s) | 2.2 | 1.0 | | 2.4 | 2.6 | 2.2 | 2.2 | 2.2 |
| Surface temperature of recording medium during recording (° C.) | 47 | 35 | | 35 | 35 | 35 | 35 | 35 |
| Color difference evaluation | C | D | A | B | C | B | B | B |
| Abrasion resistance | A | B | B | A | A | B | B | A |
| Water friction resistance | A | C | C | B | B | B | B | A |
| Image quality roughness evaluation | A | B | A | A | A | A | B | B |
| Density irregularity | A | A | A | A | A | A | A | B |

|  | Comparative Example 8 | Example 17 | Reference Example 1 | Reference Example 2 | Reference Example 3 | Reference Example 4 | Reference Example 5 |
|---|---|---|---|---|---|---|---|
| Processing solution | Processing solution 1 | Processing solution 1 | Processing solution 1 | Processing solution 1 | Processing solution 1 | — | — |
| Amount of adhering processing solution (with respect to mass % of ink) | 10 | 10 | 10 | 10 | 10 | — | — |
| Ink set configuration ink name | 1, 2, 3 | 1, 2, 3, 6 | 1, 2, 3 | 1, 2, 3, 6 | 1 | 1, 2, 3, 6 | 1, 2, 3, 6 |
| Recorded color | Green | | Green | | Cyan color | Green | Green |
| Maximum distance of scanning performed once (cm) | 120 | | 36 | | 160 | 160 | 160 |
| Maximum time of scanning performed once (s) | 1.7 | | 0.5 | | 2.2 | 2.2 | 2.2 |
| Surface temperature of recording medium during recording (° C.) | 35 | | 35 | | 35 | 35 | 50 |
| Color difference evaluation | D | A | B | A | A | C | D |
| Abrasion resistance | B | A | B | B | A | A | A |
| Water friction resistance | C | C | C | C | B | A | A |
| Image quality roughness evaluation | B | A | B | A | A | C | B |
| Density irregularity | A | A | A | A | A | C | B |

Evaluation of Color Difference

The solid patterns of the obtained recorded products were sectioned into 2×2 cm square regions, the colors of the respective regions were measured, and the largest color differences (ΔE00) between the respective regions were obtained. Occurrence of the color differences was evaluated on the basis of the following evaluation criteria. These are maximum color differences between the regions.

A: The maximum color difference between the regions satisfied ΔE≤1.0.
B: The maximum color difference between the regions satisfied 1.0<ΔE≤1.5.
C: The maximum color difference between the regions satisfied 1.5<ΔE≤2.0.
D: The maximum color difference between the regions satisfied 2.0<ΔE.

Adhesion Resistance

The recording regions of the obtained recorded products were cut into rectangular shapes of 30×150 mm and were rubbed ten times with a friction element obtained by attaching a flat woven cloth to a JSPS-type friction fastness tester AB-301 (name of product manufactured by Tester Sangyo Co., Ltd.) with application of a load of 500 g. Then, peeling of the recorded pattern portions on the recording medium was visually observed and was evaluated on the basis of the following evaluation criteria.

A: No peeling occurred, and no transfer to the cloth was observed.
B: Although no peeling occurred, transfer to the cloth was observed.
C: Peeling occurred, and the peeling area was less than 10% with respect to the evaluation area.
D: Peeling occurred, and the peeling area was equal to or greater than 10% with respect to the evaluation area.

Water Friction Resistance

The recording regions of the obtained recorded products were cut into rectangular shapes of 30×150 mm and were rubbed ten times with a friction element obtained by attaching a flat woven cloth to a JSPS-type friction fastness tester AB-301 (name of product manufactured by Tester Sangyo Co., Ltd.) with application of a load of 200 g. Then, peeling of the recorded pattern portions on the recording medium was visually observed and was evaluated on the basis of the following evaluation criteria.

A: No peeling occurred, and no transfer to the cloth was observed.
B: Although no peeling occurred, transfer to the cloth was observed.
C: Peeling occurred, and the peeling area was less than 10% with respect to the evaluation area.
D: Peeling occurred, and the peeling area was equal to or greater than 10% with respect to the evaluation area.

Evaluation of Roughness of Image Quality

The recording regions of the obtained recorded products were visually observed and evaluated on the basis of the following evaluation criteria.

A: No rough feeling was observed at all.
B: Although a rough feeling was noticeable, there was no problem.
C: There was a rough feeling.

Density Irregularity (Bleeding)

The recording regions of the obtained recorded products were visually observed and was evaluated on the basis of the following evaluation criteria.

A: No color density irregularity was observed in the plane of the solid pattern.
B: Small color density irregularity was slightly observed in the plane of the solid pattern.
C: Large color density was noticeable in the plane of the solid pattern.

It was possible to understand from the aforementioned results that excellent suppression of color differences was achieved in the obtained recorded products in all the examples in which the cyan ink, the magenta ink, the yellow ink, the special color ink, and the processing solution were used and the maximum distance of the scanning performed once was equal to or greater than 50 cm.

In contrast, suppression of color differences was inferior in any of the comparative examples that did not meet the aforementioned conditions. Details will be described below.

In comparison of Examples 7 to 10 and 4, it was possible to understand that in the case in which the surface temperature of the recording medium at the time of the adhesion of the ink was low, abrasion resistance and the water friction resistance of the obtained recorded products and suppression of roughness and density irregularity were relatively degraded. It was also estimated that the suppression of the color differences was also slightly degraded for the reason of degradation of the suppression of the density irregularity although it was not sure.

Meanwhile, it was possible to understand that abrasion resistance and water friction resistance of the obtained recorded products, roughness, and density irregularity were improved while the color differences were relatively degraded as the surface temperature of the recording medium increased. On the basis of this fact, it was possible to achieve more excellent suppression of the density irregularity and the color difference in a case in which the heating temperature of the recording medium during the adhesion was optimized.

In comparison of Examples 11 to 13, 17, and 4, it was possible to understand that the color differences tended to occur as the maximum distances of the scanning performed once were longer and the color differences tended not to occur as the maximum distances of the scanning performed once were shorter. On the basis of this fact, the embodiment is particularly useful even in a case in which a recorded product with a long distance that is useful for display or the like, due to excellent suppression of color differences.

In comparison of Examples 15, 16, and 4, the suppression of the color differences was slightly inferior regardless of whether the amounts of the adhering processing solution were large or small. It was estimated that suppression of density irregularity was slightly inferior as the amounts of the adhering processing solution were small and that the suppression of the color differences was slightly degraded due to density irregularity. Meanwhile, when the amounts of the adhering processing solution were large, trends that abrasion resistance was slightly degraded and image quality and roughness slightly increased were observed since coagulation of the constituents of the ink was promoted. It was estimated that the color differences tended to increase due to the roughness of the image quality. It was discovered that there was a more preferable amount of adhesion for the processing solution.

In comparison of Examples 14 and 4, it was discovered that more excellent suppression of the color differences was achieved as the content of the nitrogen-containing solvents in the ink increased.

Meanwhile, suppression of the color differences was inferior in Comparative Examples 1 to 8 since the special color ink was not used.

In Reference Examples 1 and 2, it was possible to understand that the problem of the color differences was a problem unique to a case in which the maximum distance of the scanning performed once was long since the problem of the color differences did not occur in a case in which the maximum distance of the scanning performed once was short. However, it was not possible to obtain recorded products that were useful for display or the like.

From Reference Example 3, it was discovered that occurrence of the color differences was not problematic as long as a primary color was recorded.

In Reference Example 4, image quality (density irregularity) was inferior since the processing solution was not used. It was not possible to coagulate the constituents of the ink with the processing solution and to fix the constituents early, ink bleeding occurred, and density irregularity occurred. The image appeared to be rough due to color density irregularity. It was estimated to be because it was not possible to stably reproduce the recording colors to be recorded due to the density irregularity and the suppression of the color differences was also degraded.

In Reference Example 5, suppression of the color density irregularity was improved by increasing the temperature of the recording medium during the adhesion of the ink while the heating temperature during the adhesion of the ink was high, the temperature irregularity significantly occurred, and the color differences deteriorated.

Note that although not described in the tables, it was possible to understand that black color recording with lower brightness and lower color saturation was able to be performed by applying Ink 9 (black ink) to the ink set in each example.

Note that when the temperature difference between the maximum temperature (temperatures in the tables) and the minimum temperature of the surface temperature of the recording medium in the platen region that was able to face the head in the main scanning of the head during the recording was checked, and the temperature difference was 4° C. in Example 12, 6° C. in Example 13, 1° C. in Example 11, 2° C. in Example 17, 10° C. in Example 10, and less than 1° C. in Reference Example 1. On the basis of the results, it was discovered that the temperature difference tended to increase as the maximum distance of the scanning performed once was longer. Also, the temperature difference tended to be large as the surface temperature of the recording medium was higher.

Although not described in the tables, when the heating temperature of the platen heater was further raised, force of wind to be fed from the fans was increased from 1 m/s to 2 m/s, and the surface temperature of the recording medium during the recording was controlled at 35° C. that was the same as that in Example 12 using a decrease in the temperature of the recording medium heated by the platen heater due to wind in Example 12, it was difficult to reduce the temperature difference between the maximum temperature and the minimum temperature, the temperature difference became 6° C., and the color difference was evaluated as C. On the basis of this fact, a large temperature difference of the recording medium was also at least one of reasons of the color difference.

Note that in the aforementioned other embodiments, the aforementioned examples may be comparative examples, or the comparative examples may be examples.

The entire disclosures of Japanese Patent Application Nos. 2018-051555, filed Mar. 19, 2018 and 2018-114639, filed Jun. 15, 2018 are expressly incorporated by reference herein.

What is claimed is:

1. A recording method comprising:
    ejecting colored ink compositions that include a cyan ink composition, a magenta ink composition, a yellow ink composition, and a special color ink composition with a hue angle that is different from hue angles of the respective ink compositions from an ink jet head and causing the ink compositions to adhere to a recording medium; and
    causing a processing solution that contains a coagulant for coagulating constituents of the colored ink compositions to adhere to the recording medium,
    wherein the causing of the ink compositions to adhere is performed by performing scanning, in which the colored ink compositions are ejected while a relative position of the ink jet head with respect to the recording medium is changed in a scanning direction, a plurality of times, and
    a maximum distance of scanning performed once in the causing of the ink compositions to adhere is equal to or greater than 50 cm.

2. The recording method according to claim 1,
    wherein the special color ink composition includes at least any of an orange ink composition, a red ink composition, a green ink composition, and a blue ink composition.

3. A recording apparatus that performs recording by the recording method according to claim 2.

4. The recording method according to claim 1,
    wherein the colored ink compositions further include a black ink composition.

5. A recording apparatus that performs recording by the recording method according to claim 4.

6. The recording method according to claim 1,
    wherein the recording medium is low-absorbable recording medium or a non-absorbable recording medium.

7. A recording apparatus that performs recording by the recording method according to claim 6.

8. The recording method according to claim 1, further comprising:
    heating the recording medium, the causing of the ink compositions to adhere being performed on the heated recording medium; or
    feeding wind to a region to which the colored ink compositions are caused to adhere in the causing of the ink compositions to adhere.

9. A recording apparatus that performs recording by the recording method according to claim 8.

10. The recording method according to claim 1,
    wherein a surface temperature of the recording medium when the colored ink compositions are caused to adhere in the causing of the ink compositions to adhere is 30° C. to 45° C.

11. A recording apparatus that performs recording by the recording method according to claim 10.

12. The recording method according to claim 1,
    wherein a maximum time of the scanning performed once in the causing of the ink compositions to adhere is equal to or greater than 0.8 seconds.

13. A recording apparatus that performs recording by the recording method according to claim 12.

14. The recording method according to claim 1,
    wherein the coagulant is any one kind or more of polyvalent metal salts, organic acids or salts thereof, and cationic resin.

15. A recording apparatus that performs recording by the recording method according to claim 14.

16. The recording method according to claim 1, wherein a maximum distance of the scanning performed once in the causing of the ink compositions to adhere is 50 to 500 cm.

17. The recording method according to claim 1, wherein a region in which an amount of the adhering processing solution is 5% to 30% by mass with respect to an amount of the adhering colored ink compositions is included in a recording region to which the colored ink compositions and the processing solutions are caused to adhere.

18. The recording method according to claim 1, wherein a temperature difference in surface temperatures of the recording medium in the causing of the ink compositions to adhere is from 1° C. to 10° C.

19. A recording apparatus that performs recording by the recording method according to claim 1.

20. A recording method comprising:

ejecting colored ink compositions that include a cyan ink composition, a magenta ink composition, a yellow ink composition, and a special color ink composition with a hue angle that is different from hue angles of the respective ink compositions from an ink jet head and causing the ink compositions to adhere to a recording medium; and causing a processing solution that contains a coagulant for coagulating constituents of the colored ink compositions to adhere to the recording medium, wherein the causing of the ink compositions to adhere is performed by performing scanning, in which the colored ink compositions are ejected while a relative position of the ink jet head with respect to the recording medium is changed in a scanning direction, a plurality of times, and a difference in surface temperatures of the recording medium when the colored ink is caused to adhere in the causing of the ink compositions to adhere is from 1° C. to 10° C.

* * * * *